United States Patent
Wolff et al.

(10) Patent No.: US 6,366,970 B1
(45) Date of Patent: Apr. 2, 2002

(54) OPTIMAL HANDLING AND MANIPULATION OF HIGH-SPEED STREAMING MEDIA IN A COMPUTING DEVICE

(75) Inventors: Robert M. Wolff, Fremont, CA (US); Randy Langer, Port Orchard, WA (US)

(73) Assignee: Ravisent Technologies, Inc., Malvern, PA (US)

( * ) Notice: Subject to any disclaimer, the term of this patent is extended or adjusted under 35 U.S.C. 154(b) by 0 days.

(21) Appl. No.: 09/283,947

(22) Filed: Apr. 1, 1999

(51) Int. Cl.$^7$ ............................................... G06F 13/14
(52) U.S. Cl. ...................... 710/52; 709/212; 709/250; 709/302
(58) Field of Search ............................ 710/52; 709/250, 709/302, 212

(56) References Cited

U.S. PATENT DOCUMENTS

| | | | | |
|---|---|---|---|---|
| 4,951,194 A | * | 8/1990 | Bradley et al. | 711/132 |
| 5,703,887 A | * | 12/1997 | Heegard et al. | 714/775 |
| 5,758,075 A | * | 5/1998 | Graziano et al. | 709/250 |
| 5,778,180 A | * | 7/1998 | Gentry et al. | 709/212 |
| 5,875,442 A | * | 2/1999 | Jordan, II et al. | 707/2 |
| 5,938,734 A | * | 8/1999 | Yao et al. | 709/232 |
| 6,061,770 A | * | 5/2000 | Franklin | 711/162 |
| 6,081,846 A | * | 6/2000 | Hyder et al. | 709/250 |
| 6,081,883 A | * | 6/2000 | Popelka et al. | 712/28 |
| 6,170,075 B1 | * | 1/2001 | Schuster et al. | 714/776 |
| 6,226,769 B1 | * | 5/2001 | Schuster et al. | 714/752 |
| 6,247,071 B1 | * | 6/2001 | Cardosa, Jr. | 740/52 |

FOREIGN PATENT DOCUMENTS

JP  02000112849  *  4/2000  ........... G06F/13/00

OTHER PUBLICATIONS

MPEG–2: *The basics of how it works*, Unknown.
Clark et al, PROVIDING SCALABLE WEB SERVICE USING MULTICAST DELIVERY, 1995 IEEE, 19–26.*

* cited by examiner

*Primary Examiner*—Thomas Lee
*Assistant Examiner*—Abdelmoniem Elamin
(74) *Attorney, Agent, or Firm*—Michael A. Glenn

(57) ABSTRACT

A method and apparatus for optimal handling of high bandwidth streaming data in a computer system minimizes computational activities to achieve maximal performance. This performance improvement is accomplished by minimizing the amount of memory copying and also by minimizing the number of allocation and deallocations of objects which occur. Memory copying is a CPU/bandwidth intense operation when there is high speed streaming data on the input. The allocation and deallocation of objects is a system resource intense activity and requires a very significant amount of CPU processing per invocation in a computing device. Using a combination of techniques, the invention provides a technique that reduces both the number of memory copies as well as the number of objects which get allocated and deallocated during the course of operating on the streaming media data.

8 Claims, 3 Drawing Sheets

OPTIMAL HANDLING AND MANIPULATION OF HIGH-SPEED STREAMING MEDIA IN A COMPUTING DEVICE

BACKGROUND OF THE INVENTION

1. Technical Field

The invention relates to data processing. More particularly, the invention relates to handling and manipulating high-speed streaming data in a computing device.

2. Description of the Prior Art

The transfer of information in the form of streaming data is of increasing importance. Streaming data are data that are transferred, typically in real time, as a continuous and uninterrupted stream using such formats as MPEG2. While MPEG-2 has been used in static media such as DVD and is well known to the general public, it is less known that MPEG-2 has been used in streaming (real-time) applications such as digital satellite broadcast, e.g. DSS, DVB, Primestar, and Dishnetwork.

In such environments, the data are transmitted at variable rates. This streaming of data presents significant problems to a device that is to receive the data. For example, it is not possible to go back and resample the data as with a DVD because the data are streaming, i.e. they are not fixed on a medium that may be reread if an error in data transfer is detected—they have evaporated into the ether. Thus, it is extremely difficult to recover from a failure in the transfer of a data block where the data block is part of an emphemeral data stream.

Heavy use of memory copying and/or heavy use of allocation and deallocation of software objects and/or hardwired & inflexible memory usage have been the traditional software engineering approaches to solving the problem of processing streaming data. All of these methods require a significant percentage of available computing time and bandwidth inside the computing device. In the non-streaming case, compute time is generally not as significant an issue because a job can be processed in a pseudo batch mode. Unfortunately, in the case of streaming media, such as satellite data in the form of audio, video, and data, there is no way to control the rate of the incoming data. Poor data handling leads to input data overruns and a resultant loss of input data.

The computing device must be capable of handling the data stream in a worst case scenario. When a large amount of memory copying or allocation and deallocation is performed in the computing device, the system has fewer resources available for processing other incoming requests and for general activities. This leaves the computing device with too much to do in heavy loading cases, with errors or data loss being the result.

A possible approach to solving the problem of processing streaming data may be provided by a memory manager, such as SmartHeap™, which uses a recycled memory buffer for the specific purpose of memory management. However, these techniques have not been applied to the realm of streaming media. It is also possible to use multiple threads for streamlining control and delineation of duties. Again, such known technology is not specifically targeted to the problems associated with the handling of streaming media. Therefore, these techniques are not specifically made for streaming and are found to be suboptimal due to their lack of specific focus on these streaming issues.

It would be advantageous to provide an efficient and reliable method and apparatus for processing streaming data in a computer system.

SUMMARY OF THE INVENTION

The invention provides a method and apparatus that offers optimal handling of high bandwidth streaming data in a computer system. An overall objective in such a system is to minimize computational activities and thereby achieve maximal performance. This result is accomplished in the invention described herein by minimizing the amount of memory copying and also by minimizing the number of allocations and deallocations of objects.

Memory copying is a CPU/bandwidth intense operation when there is high speed streaming data on the input. The allocation and deallocation of objects is a system resource intense activity and requires a very significant amount of CPU processing per invocation in a computing device. Using a combination of techniques, the invention provides a technique that reduces both the number of memory copies as well as the number of objects which get allocated and deallocated during the course of operating on the streaming media data.

DETAILED DESCRIPTION OF THE INVENTION

As discussed above, heavy use of memory copying and/or heavy use of allocation and deallocation of software objects have been the traditional software engineering approaches to solving the problem of processing streaming data.

Figure 1:
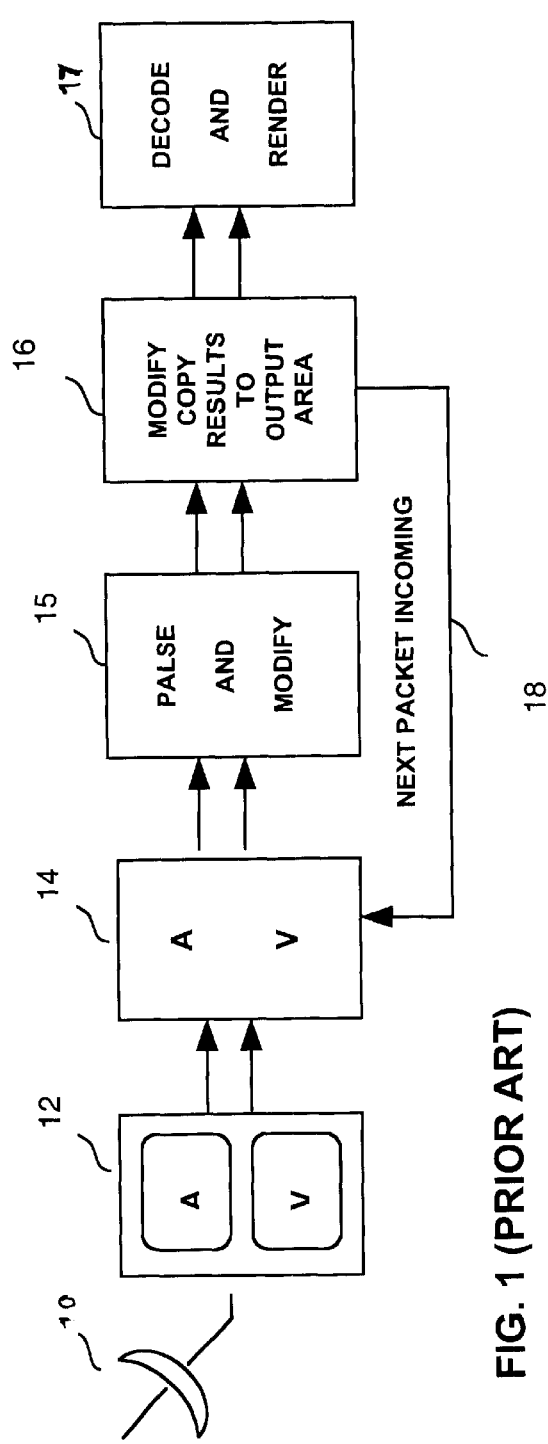
FIG. 1 is a block schematic diagram of a system for processing streaming data that uses few allocations of objects and that makes many copies of such objects.

FIG. 1 is a block schematic diagram of a system for processing streaming data that uses few allocations of objects and that makes many copies of such objects. As shown in FIG. 1, a satellite antenna 10 receives streaming data in the form of a broadcast signal. The signal is provided to a driver 12 and thence to a memory 14. The incoming data are allocated and copied to the memory. The data are read from memory and processed by a module 15 that parses and modifies the data as necessary for use in the system. The results of the parse and modification step are copied to a memory output area 16 and thence decoded and rendered by a module 17 for use in the system. Once a data packet is processed, the system is alerted to begin processing the next incoming packet 18 and the process repeats.

It can be seen that the foregoing approach is memory intensive.

Figure 2:
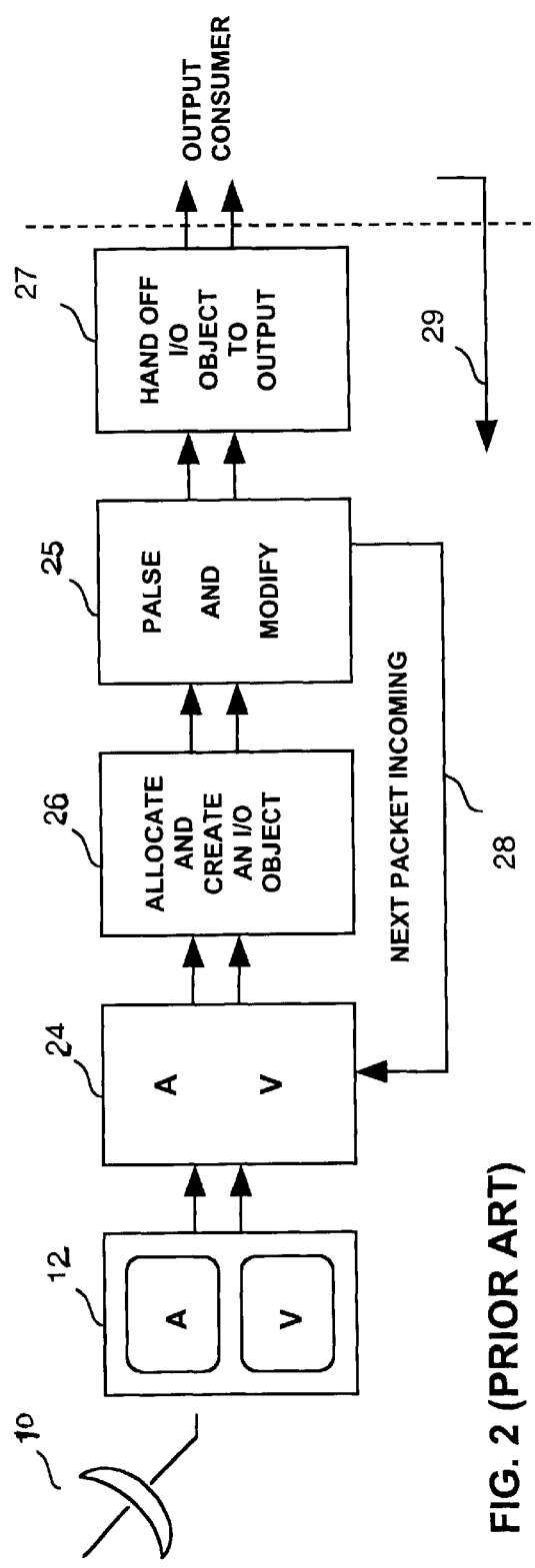
FIG. 2 is a block schematic diagram of a system for processing streaming data that uses many allocations of objects and that makes few copies of such objects.

FIG. 2 is a block schematic diagram of a system for processing streaming data that uses many allocations of objects and that makes few copies of such objects. As shown in FIG. 2, a satellite antenna 10 receives streaming data in the form of a broadcast signal. The signal is provided to a driver 12 and thence to a memory 24 which maintains a local copy of the incoming data. The system includes a module 26 that allocates and creates an I/O object of the incoming data, which is then parsed and modified 25. Once processing is completed, the I/O object is handed off 27 to an output consumer (not shown). The consumer uses the output data and the advises the system that it is finished with the I/O object at which point the object is deallocated and destroyed. Thereafter, the system is alerted to begin processing the next incoming packet 28, at which point the process is repeated.

It can be seen that the foregoing approach requires a significant amount of object allocation/deallocation.

The invention provides a method and apparatus that offers optimal handling of high bandwidth streaming data in a computer system. An overall objective in such a system is to minimize computational activities and thereby achieve maximal performance. This result is accomplished in the invention described herein by minimizing the amount of memory copying and also by minimizing the number of allocation and deallocations of objects which occur.

Figure 3:
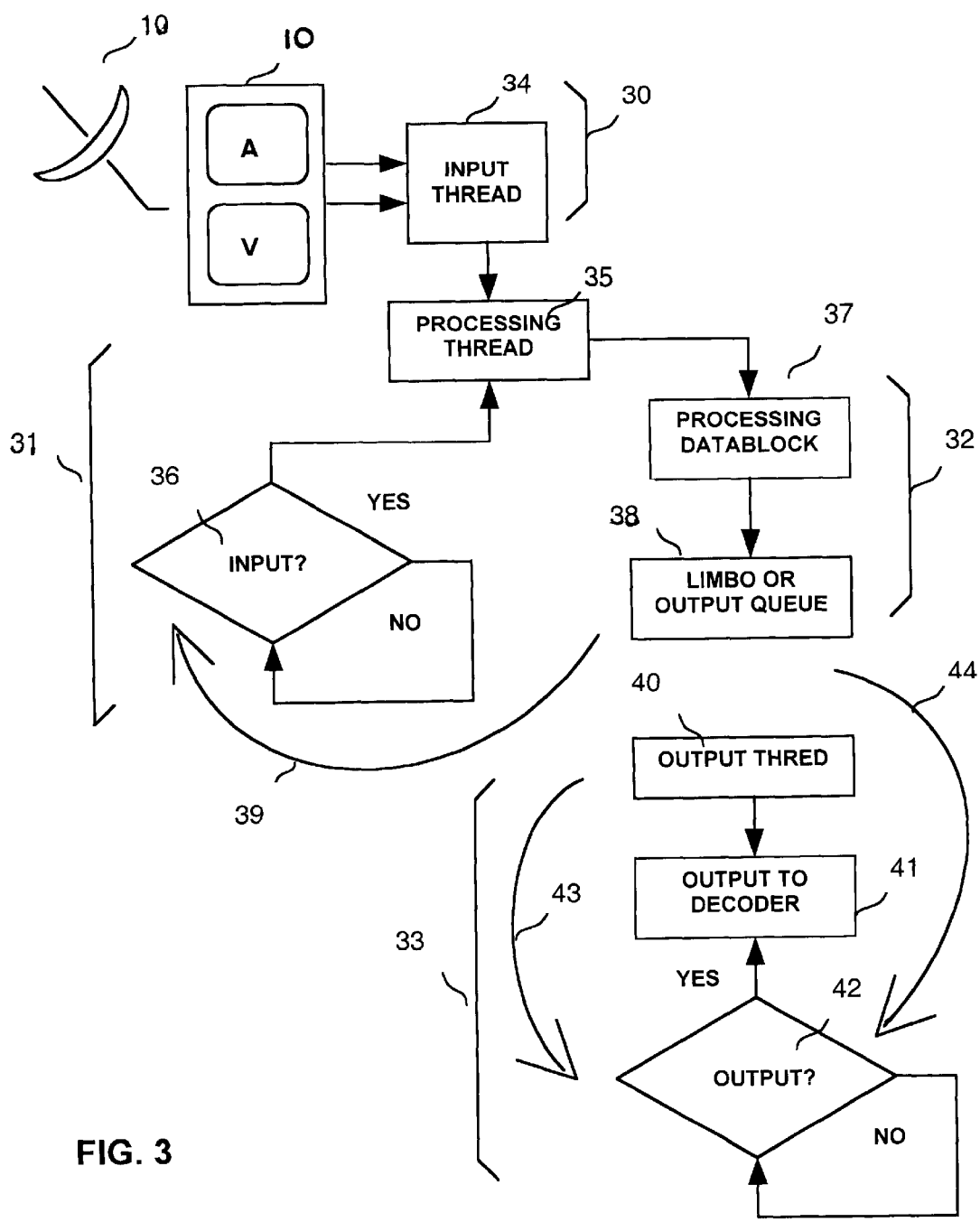
FIG. 3 is a block schematic diagram of a system for optimal handling and manipulation of high-speed streaming data in a computing device according to the invention.

FIG. 3 is a block schematic diagram of a system for optimal handling and manipulation of high-speed streaming data in a computing device according to the invention. The techniques that are employed by the system disclosed herein to reduce the number of memory copies and the number of objects allocations/deallocations while processing streaming data include:

Using memory reference objects rather than copies of memory whenever possible. These memory reference objects are referred to herein as data blocks.

The use of up to four separate queues or lists which contain lists of references to the data blocks. The four queues are an:
  a) Idle queue 30 which is used to keep a cache of currently unused data block objects. This facilitates recycling objects to minimize the allocation and deallocation of these data block objects;
  b) Input queue 31 which is used as a holding area for incoming data blocks until each block can be processed;
  c) Limbo queue 32 which is used for localized streams which are larger than a single data block that needs to be held for further global processing prior to being placed in the output queue; and
  d) Output queue 33 which is the queue which holds the resultant data blocks after they are processed from input to limbo and finally placed into the output queue. When a data block is taken from the output queue and its resultant data is sent to the decoder or post processing unit, the data block is placed back onto the idle queue for reuse. The data block is not deallocated at this point.

Segmented processing duties via multithreading. Three separate processing threads are used to facilitate separation of duties. There is an:
  a) Input thread 34 which takes incoming data from the streaming media source and makes a data block by pulling a data block from the idle queue, assigns referenced memory pointers to the incoming data, and then places the new data block onto the input queue;
  b) Processing thread 35 which takes data blocks from the input queue and processes the block by parsing and/or modifying the data as necessary to prepare the data block for output. If it is determined 36 that all of the required information for a localized stream of data is not fully contained in a single data block, then the data block is placed in the limbo queue 37, 38 until the localized stream is complete 39. When a localized stream is completely processed, the data blocks which makeup the localized fully processed stream are moved to the output queue 44; and
  c) Output thread 40 which is responsible for taking data blocks from the output queue and which provides a module 41 for handing the resultant data to the downstream processing unit, which in the preferred embodiment is usually a digital audio/video decoder. The corresponding data block is then placed back on the idle queue 42, 43 for use again by an incoming data packet/stream.

This completes the circle of recycling object usage, thereby reducing the allocation and deallocation of objects to nearly zero. The only cases where data block objects are allocated is when there is a request to get a data block from the idle queue when the idle queue is empty. The only time when a data block is deallocated during processing is if there are a very large number of data block objects which are on the idle queue for a long period of time. Deallocation of one or more of these idle data blocks must be handled carefully so as to not create hysteresis, whereby allocation and deallocation occurs frequently due to the cyclic nature of the incoming data packets. However, this is mostly an implementation concern and does not affect the operation of the invention.

Complexity of the invention is minimized by use of the three separate threads which have separate and specific duties. Memory copies are minimized by only making reference to the incoming streaming data packets rather than copying the incoming data. The data block object is a very small object which describes where the input data is found, how big the input data is, and where the output/resultant data is post-processed, as well as the status of each of these input and output memory references. It is possible to have situations where the input and/or output are at times actually allocated and/or copied. These are the exception rather than the rule, but the responsibility for keeping track of such events lies with the data block object itself.

Allocation and deallocation of data blocks is reduced to near-zero by use of the idle queue as an object recycling center. This is a very powerful concept for a streaming application because data are always coming in, being processed, and being output. The constant movement of data makes this concept very valuable.

Figure 4:
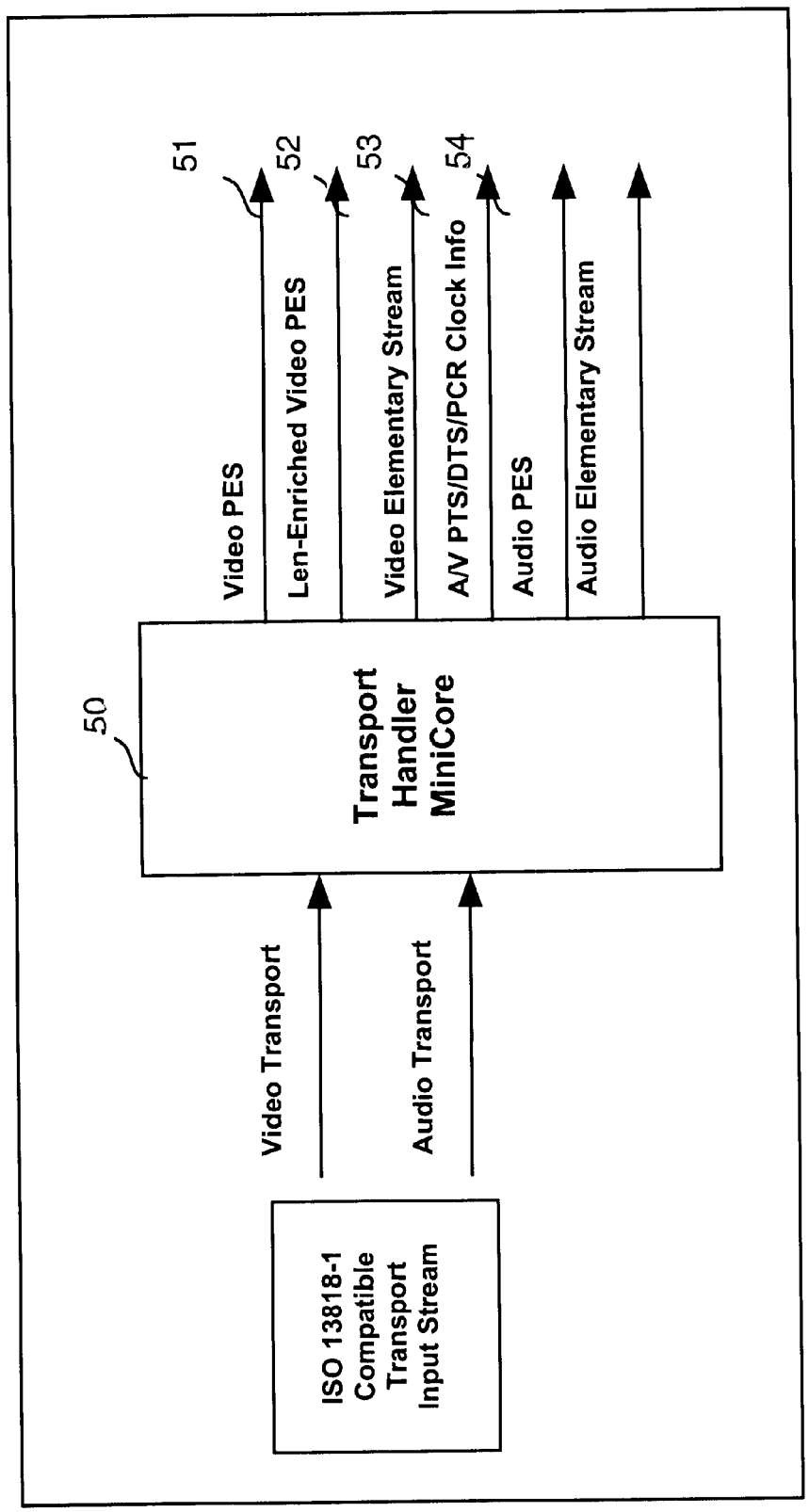
FIG. 4 is a block schematic diagram of a transport handler minicore for optimal handling and manipulation of high-speed streaming data in a computing device according to the invention.

FIG. 4 is a block schematic diagram of a transport handler minicore 50 for optimal handling and manipulation of high-speed streaming data in a computing device according to the invention. The following discussion describes a presently preferred architectural approach for handling ISO 13818-1 (See www.mpeg.org, www.ansi.org (ISO 13818-1)) transport streams in software and for translating these transport streams into various formats of MPEG streams according to the invention.

This embodiment of the invention finds application in the area of satellite and terrestrial broadcast transport. A major function of the minicore is to receive ISO 13818-1 transport stream packets as an input, i.e. the DVB transport stream and translate these packets into other useful MPEG formats at the user's request. The minicore also provides timestamp and clock reference information to the consumer of this information on a side-interface which correlates this clock information to the audio and video data streams on the output interfaces.

The transport minicore provides on its output interfaces:
  PES 51 with zero-length PES headers in the case of DVB video PIDs.

Length-enriched PES 52, reconstituted to contain length fields for all PES packets regardless of input payload length and 64 k/16 bit length field limitations.

Elementary stream 53 with all extraneous packetization removed.

Paresd/validated presentation time stamps, decode time stamps, transport clock references 54 (SCR/PCR).

Correlation of clocking information to audio stream and video stream byte indices.

These interface outputs and input of transport data are provided in the preferred embodiment of the invention as a Microsoft Visual C++ ".lib" file, ".h" header file, and ".dll" file.

EXAMPLE

The following tables are source code listings C++ implementation of a preferred embodiment of the invention.

Table A is a source code listing of a C++-specific buffer that is recycled for processing data blocks from an input quene and that puts these data blocks on an output quene after processing.

TABLE A

Recycled Buffer Processing Source Code Listing

```
// DataBlock.cpp: implementation of the CDatablockclass.
//
//////////////////////////////////////////////////////////
#include "DataBlock.h"
#define PESHEADERSIZE 32       // This is a maximum conservative value.
//////////////////////////////////////////////////////////
// Construction/Destruction
//////////////////////////////////////////////////////////
void HexAsciiDump(char* pdest, char* psrc, int len)
{
    int I, line, len_cur;
    char dat[5];
    char linebuf[100];
    assent(len < 200);        // Sane value
    strcpy(pdest, "HA-Dump:");
    for (line=0;line<=len/16;line++)
    {
        len_cur=16;
        if(line*16 + 16 >= len)
            len cur = len % 16;
        linebuf[0] = 0;
        for (i=0 ; I<len_cur; i++)
        {
            sprintf(dat, "%02x", (unsigned char)psrc[line*16 + I]);
            strcat(linebuf, dat);
        }
        strcat(linebuf ":");
        strcat(pdest, linebuf);
        for (i=0 ; I<len_cur; i++)
        {
            if(isalpha(psrc[line*16 + I]))
            {
                sprintf(dat, "%c", psrc[line* 16 + I]);
                strcat(pdest, dat);
            }
            else
            {
                strcpy(dat, ".");
                strcat(pdest, dat);
            }
        }
        strcat(pdest, "\n      ");
    }
    strcat(pdest, "\n");
}
CDataBlockList::CDataBlockList( )
{
}
CDataBlockList::~CDataBlockList( )
{
    while(!IsEmpty( ))
        delete RemoveHead( );
}
POSITION CDataBlockList::AddBlock(CDataBlock* ptr)
{
    return AddTail(ptr);
}
CDataBlock* CDataBlockList::RemoveHead( )
{
    assert(!IsEmpty( ));
    if (IsEmpty( ))
```

TABLE A-continued

Recycled Buffer Processing Source Code Listing

```
            return NULL;
        else
            return (CDataBlock*)CPtrList::RemoveHead( );
}
CDataBlock::CDataBlock(CCircularBuff* p_bin, CCircularBuff* p_bout, QI_InputStreamType it,
QI_OutputStreamType ot)
{
    assert(p_bin);
    assert(p_bout);
    assert(it>InvalidMinIT && it<InvalidMaxIT);
    assert(ot>InvalidMinOT && ot<InvalidMaxOT);
    fp_dump=NULL;
    prev_cont = 0 x ff;         // forgive next one to get back in sync.
    p_copy_lasttrans = NULL;
    p_copy_curtrans = NULL;
    p_copy_nexttrans = NULL;
    p_circ_in = p_bin;
    p_circ_out = p_bout;
    in_type = it;
    out_type = ot;
    p_data_in = NULL;
    len_data_in = 0;
    p_data_out = NULL;
    len_data_out = 0;
    p_curout = NULL;
    p_ancillary_start = NULL;
    p_ancillary_cur = NULL;
    num_ancillary = 0;
    tp = NULL;
    index = 0;
    PES_length = 0;
    scrambling_control = 0;
    data_alignment_indicator = 0;
    PTS_DTS_flags = 0;
    PTS = 0;
    DTS = 0;
    bLookingForSync = FALSE;
    lastAncillary = InvalidMinAT;
}
CDataBlock::~CDataBlock( )
{
    if (fp_dump)
        fclose(fp_dump);
    DeleteTempTrans( );
}
int CDataBlock::InputCopy(char * p_in, unsigned long len)
{
    // This function should only be called ONCE for an input block of data to process.
    assert(!p_data_in);
    p_data_in = p_circ_in->GetMemoryBlock(len);
    len_data_in = len;
    if(!p_data_in)
        return QI_NO_MEMORY;
    // Now that we have an input buffer for it, copy the data.
    memcpy(p_data_in, p_in, len);
    // The output side allocations will be delayed until processing of the data actually takes place.
    return QI_OK;
}
//
// Here is the meat of the matter. This function is the one that handles the parsing
// control of the input buffer. It then copies out data to the output buffer.
//
void CDataBlock::ProcessBlock( )
{
    int I, num_packets;
    unsigned char* p_packet;
    unsigned char* p_payload_start;
    unsigned int payload_length;
    SetupOutputBuffer( );
    disc_errors = 0;
    p_packet = p_data_in
    num_packets = len_data_in/TRANSPORT_SIZE;
    for (i=0; I<num_packets; i++, p_packet += TRANSPORT_SIZE)
    {
        SYNC_index = -1
        lastAncillary = InvalidMinAT;
        p_payload_start = ParseTransport(p_packet, &payload_length);
```

TABLE A-continued

Recycled Buffer Processing Source Code Listing

```
        if (IsErrBitSet(aBadSyncByte47))
        {
            continue;
        }
        // Tally discontinuity errors for this block. Upstream may want this for statistical info.
        if (IsErrBitSet(aDiscontinuity))
            disc_errors++;
        // Do some kind of CC and "debug" if we have NO payload *OR*
        // if we actually have a real discontinuity error.
        if (payload_length==0 || lastAncillary==aDiscontinuity)
        {
            DumpDataBlock(p_data_in, I, num_packets, lastAncillary);
            DeleteTempTrans( );
            // If we have a current AND a "last" then we copy both.
            p_copy_curtrans = new unsigned char[TRANSPORT_SIZE];
            assert(p_copy_curtrans);
            memcpy(p_copy_curtrans, p_packet, TRANSPORT_SIZE);
            // Now copy the last packet, (if we have one . . . I>0)
            if(I>0)
            {
                p_copy_lasttrans = new unsigned char[TRANSPORT_SIZE];
                assert(p_copy_lasttrans);
                memcpy(p_copy_lasttrans, p_packet-TRANSPORT_SIZE,
TRANSPORT_SIZE);
            }
            // Do we have a "next" one to look at too?
            if (I<num_packets-1)
            {
                p_copy_nexttrans = new unsigned char[TRANSPORT_SIZE];
                assert(p_copy_nexttrans);
                memcpy(p_copy_nexttrans, p_packet+TRANSPORT_SIZE,
TRANSPORT_SIZE);
            }
        }
        // Check out lastAncillary for information on why payload_length=0.
        // If aRepeatPacket, check out p_copy_lasttrans and p_copy_curtrans
        assert(/*payload_length && */payload_length<185);
        // If this packet is ONLY ancillary data or stuffing, we will have no payload.
        if (p_payload_start && payload_length)
        {
            if (!bLookingForSync)
            {
                memcpy(p_curout, p_payload_start, payload_length);
                p_curout += payload_length;
                len_data_out += payload_length;
            }
            else
            {
                if(SYNC_index == -1)
                {
                    // Drop all data until a video sequence is found.
                }
                else
                {
                    // Found seq. Copy "remainder".
                    memcpy(p_curout, tp+SYNC_index, TRANSPORT_SIZE-
SYNC_index);
                    p_curout += TRANSPORT_SIZE-SYNC_index;
                    len_data_out += TRANSPORT_SIZE-SYNC_index;
                    bLookingForSync = FALSE;
                }
            }
        }
    }
    // haywire check.
    assert(len_data_out <(len data_in+PESHEADERSIZE));
    FixupAncillaryPointers( );
}
void CDataBlock::SetupOutputBuffer( )
{
unsigned long len_out;
    //
    // Output is always guaranteed to be smaller or equal to input EXCEPT in the
// case of Length_Enriched_PES which might have extra manufactured PES packets
// inserted in the output which will "stretch" the size. However, even in
// this mode, there are a minimum of 4 bytes which are shrunk per 188 bytes
// of input which means that a "short" PES packet of about 20 bytes is
```

TABLE A-continued

Recycled Buffer Processing Source Code Listing

```
// gained for every 5 transport packets at least (5packets * 4bytes/packet = 20 bytes)
// By allocating one extra "large" pes header worth of data, we insure ourselves
// from overflow even in the case of a single packet incoming.
    //
    len_out_len_data_in + PESHEADERSIZE;
    p_data_out = p_cir_out->GetMemoryBlock(len_out);
    if (!p_data_out)
    {
        assert("No output pointer given??"==NULL);
        return;
    }
    p_curout = p_data_out
    // Ancillary data gets laid down in "array" fashion at the end of the
    // data_out buffer. When the scan is complete, we know how big the ancillary
    // data is and will do a "fixup" where we request GetMemoryBlock(ancillary_len)
    // and then continue.
    p_ancillary_start = p_data_out + len_out;
    p_ancillary_cur = p_ancillary_start;
    num_ancillary = 0;
}
//
// The ancillary data has been laid down in the memory block just past the output buffer
// during the parsing operations. Since we never know how many ancillary data items will
// be found, we are cheating the circular buffer by not asking for the memory until AFTER
// we've already laid data down in the spot that we want it. During the laydown process,
// the end-of-buffer/wrap condition is checked for and if this occurs, all the ancillary
// data is moved to the beginning of the circular buffer and the pointers are reset
// to reflect this change.
//
// The only thing that needs to be guaranteed here is that no one does a GetMemoryBlock( )
// during the time while we are processing the block. Since this is an "atomic" operation,
// there should be no problem.
//
// So, when the block is completely parsed, we know how much ancillary data there is and
// therefore how much memory to request from p_circ_out for the memory space. If all is
// well, we'll get the memory pointer from the request where we already started laying
// down the data.
//
void CDataBlock::FixupAncillaryPointers( )
{
    unsigned char* p_bufreturned;
    p_bufreturned = p_circ_out->GetMemoryBlock(num_ancillary * sizeof(QI_ANCILLARY_DATA));
    assert(p_bufreturned);
    assert(p_bufreturned == p_ancillary_start);
}
unsigned char* CDataBlock::ParseTransport(unsigned char * p_packet, unsigned int* p_payload_len)
{
BOOL bpayload_unit_start;
WORD PID;
unsigned char* p_temp_tp;
unsigned char Scrambled;
unsigned char cont_count;
unsigned char adap_field;
    ErrBits = 0;
    tp = p_packet;
    index = 0;
    *p_payload_len = 0;
    if(tp[index++] != 0 x 47)
    {
        MakeAncillary(aBadSyncByte47, 0 x 00, QI_DISC_BAD_SYNCBYTE);
        lastAncillary = aBadSyncByte47;
//      assert("No SyncByte 0 x 47 in transport packet"==NULL);
        // With no sync byte, it is unsafe to continue.
        return NULL;
    }
    if(tp[index] & 0 x 80)
        MakeAncillary(aDiscontinuity, 0 x 01, QI_DISC_TRANSERROR);
    // Dont forget to make an ancillary for this later if it is true.
    bpayload_unit_start = (tp[index] & 0 x 40) >> 6;
    // 13 bits constitute the PID.
    PID = ((tp[index++] << 8) | tp[index++]) & 0 x 1fff;
    if (PID==0 x 1fff)
    {
        MakeAncillary(aStuffingPacket, 0 x 01, 0 x 00);
        lastAncillary = aStuffingPacket;
        // make message for this discarded "stuffing packet"??
```

TABLE A-continued

Recycled Buffer Processing Source Code Listing

```
        return NULL;
    }
    Scrambled = (tp[index] & 0 x c0) >> 6;
    if (Scrambled)
    {
        // Packet is scrambled.
        MakeAncillary(aScrambled, index, 0 x 00);
    }
    // 0 x 11 and 0 x 10 tell us that the adaptation field is indeed present.
    adap_field = tp[index] & 0 x 30;
    cont_count = tp[index++] & 0 x 0f;
    if (adap_field & 0 x 20)
        ParseAdaptationField( );
    // 0 x 01 and 0 x 11 indicate that payload is present.
    // 0 x 10 is adaptation field only. 0 x 00 is reserved.
    if(!(adap_field & 0 x 10))
    {
        MakeAncillary(aNoPayload, index, 0 x 00);
        lastAncillary = aNoPayload;
        // No payload in this packet.
        return NULL;
    }
//#if0
    // Continuity counter check. It should advance modulo 0 x 0f in all cases
    // except when there are:
    // 1. Repeat packets (stays the same)
    // 2. If there is no payload (already skipped out anyway)
    if (prev_cont==0 x ff)
        prev_cont = cont_count;
    else
    {
        if (prev_cont = cont_count)
        {
            // Repeated transport packet. Ignore it.
            lastAncillary = aRepeatPacket;
            return NULL;
        }
        else
        {
            if( ((prev_cont+1)%0 x 10) == cont_count)
                prev_cont = cont_count;
            else
            {
                // Continuity error
                prev_cont = 0 x ff;          // forgive next one to get back in sync.
                MakeAncillary(aDiscontinuity, index-1, QI_DISC_CONTCOUNTER);
                lastAncillary = aDiscontinuity;
                // Go ahead and let this packet go through. It is probably good.
                // It is important to RECOGNIZE it up top though. Do not "return
NULL;" here.
                bLookingForSync = TRUE;       // Now we should skip payload data
until a new SEQ header.
            }
        }
    }
//#endif
    if (Scrambled)
    {
        MakeAncillary(aScrambled, index, 0 x 00);
        lastAncillary = aScrambled;
        // Cannot deal with payload in scrambled packets. Kick out with no payload.
        return NULL;
    }
    if (bpayload_unit_start)
    {
        MakeAncillary(aPESHeader, index, 0 x 00);
        // Now deal with the payload
        assert(tp[index]==0 x 00 && tp[index+1]==0 x 00 && tp[index+2]==0 x 01 &&
tp[index+3]>0 x bc);
        // Mark down where we are as we'll want to "backup" in PES situations after parsing is
complete.
        p_temp_tp = tp + index;
        ParsePESHeader( );
        assert(scrambling_control==0 x 00); // What to do? Does this conflict with transport
scrambling control?
        switch(out_type)
        {
```

TABLE A-continued

Recycled Buffer Processing Source Code Listing

```
            case ES:
                // Write out starting at tp as this is the beginning of the ES payload.
                *p_payload_len = TRANSPORT_SIZE-index;
                return tp + index;
            case PES:
                // PES or LengthRichPES
                // ifLengthRichPES, we need to "tag" this REAL header for later use with
                // the length enriching game.
                //
                // If it is just PES, then use the pre-parsing tp pointer to calculate length and
start.
                *p_payload_len = TRANSPORT_SIZE-(p_temp_tp-p_packet);
                return p_temp_tp;
            case TS:
                break;
            default:
                assert(FALSE);
                return NULL;
            }
        }
        else
        {
            switch(out_type)
            {
            case ES:
            case PES:
            case LengthRichPES:
                // Payload is just payload of PES.
                *p_payload_len = TRANSPORT_SIZE-index;
                return tp + index;
            case TS:
                *p_payload_len = TRANSPORT_SIZE;
                return p_packet;
            default:
                assert(FALSE);
                return NULL;
            }
        }
        assert(FALSE);
        return NULL;
}
void CDataBlock::ParseAdaptationField( )
{
int adapt-len;
unsigned char disc_ind random_access, es_priority, PCR_flag;
//unsigned char OPCR_flag, splicing_point, private_data, adapt_extension;
unsigned char* p_payloadnext;
DWORDLONG PCRb, PCRx;
        adapt_len = tp[index++];
        if (!adapt_len)
            return;
        p_payloadnext = tp + index + adapt_len;        // With non-zero length, need this for later.
        disc_ind       = tp[index] & 0 x 80;
        random_access = tp[index] & 0 x 40;
        es_priority                     = tp[index] & 0 x 20;
        PCR_flag                        = tp[index] & 0 x 10;
        OPCR_flag                       = tp[index] & 0 x 08;
        splicing_point  = tp[index] & 0 x 04;
        private_data    = tp[index] & 0 x 02;
        adapt_extension = tp[index] & 0 x 01;
        index++;
        if (disc_ind)
            MakeAncillary(aDiscontinuity, index-1, QI_DISC_ADAPT_FIELD);
            if (PCR_flag)
            {
            // Breakdown is: 33 bits are PCRb followed by 6 reserved bits followed by 9 bits of
PCRx
            // <<8 makes resultant byte [15. .8]
            // <<16 makes resultant byte [23. .16]
            // <<24 makes resultant byte [31. .24]
            PCRb = (tp[index]<<25) | (tp[index+1]<<17) | (tp[index+2]<<9) | (tp[index+3]<<1) |
(tp[index+4]&0 x 80);
            PCRx = ((tp[index+4]&0 x 01)<<8) | tp[index+5];
            MakeAncillary(aPCRb, index, PCRb);
            MakeAncillary(aPCRx, index, PCRx);
            index += 6;
        }
```

TABLE A-continued

Recycled Buffer Processing Source Code Listing

```
    // We're going to ignore the OPCR, splicing point, private data, and extensions. So, we can just
    // comment out this chunk of code to the end.
/* Ignoring fields that we dont care about.
        if (OPCR_flag)
        {
            // Breakdown is: 33 bits are PCRb followed by 6 reserved bits followed by 9 bits of
PCRx
            // <<8 makes resultant byte [15. .8]
            // <<16 makes resultant byte [23. .16]
            // <<24 makes resultant byte [31. .24]
//          PCRb = (tp[index]<<25) | (tp[index+1]<<17) | (tp[index+2]<<9) | (tp[index+3]<<1) |
(tp[index+4]&0 x 80);
//          PCRx = ((tp[index+4]&0 x 01)<<8) | tp[index+5];
//          MakeAncillary(aPCRb, index, PCRb);
//          MakeAncillary(aPCRx, index, PCRx);
            index += 6;
        }
        // Ignoring splicing point countdown.
        if (splicing_point)
            index++;
        if (private_data)
            index += (1 + tp[index]); // Jump past length byte plus private data bytes too.
        if (adapt_extension)
            index += (1 + tp[index]); // Jump past length of extension plus the extension bytes too.
*/
        index = p_payloadnext-tp;         // Skips stuffing bytes etc by previous calculation.
}
void CDataBlock::ParsePESHeader( )
{
    unsigned char tmp;
    DWORD dw_tmp;
    unsigned char ESCR_flag, ES_rate_flag, DSM_trick_mode_flag;
    unsigned char add_copy_info_flag, PES_CRC_flag, PES_extensions_flag;
    unsigned char* p_payload_start_actual;
    int PES_header_length;
    dw_tmp = (tp[index]<< 16) | (tp[index+1]<<8) | tp[index+2];
    index += 3;
    assert(dw_tmp==0 x 000001);
    // Grab the stream ID from the header
    tmp = tp[index++];
    switch(in_type)
    {
    case VideoTS:
        assert(tmp>= 0 x e0 && tmp<=0 x ef);
        break;
    case AudioTS:
        assert(tmp>= 0 x c0 && tmp<= 0 x df);
        break;
    default:
        assert(FALSE);
        break;
    }
    PES_length = (tp[index++]<<8) | tp[index++];
    // Begin bit-parsing
    assert((tp[index] & 0 x c0)==0 x 80);              // Looking for "10" in binary for markerbits
    scrambling_control = (tp[index] & 0 x 30); >> 4;   // nonzero result means scrambled.
    data_alignment_indicator = tp[index++] & 0 x 04;   // Nonzero indicates payload starts with
"interesting" data.
    // Next bitflag byte.
    PTS_DTS_flags = (tp[index] & 0 x c0)>>6; // 00=none, 01=illegal, 10=PTS, 11=PTS+DTS
    ESCR_flag = tp[index] & 0 x 20;
    ES_rate_flag = tp[index] & 0 x 10;
    DSM_trick_mode_flag = tp[index] & 0 x 08;
    add_copy_info_flag =tp[index] & 0 x 04;
    PES_CRC_flag = tp[index] & 0 x 02;
    PES_extensions_flag = tp[index++] & 0 x 01;
    // PES header length next.
    PES_header_length = tp[index++];
    assert(PES_header_length);
    // Now save off our current position for later calculations.
    p_payload_start_actual = tp + index + PES header_length;
    if (data_alignment_indicator)
    {
        if (in_type==VideoTS && p_payload_start_actual[0]==0 &&
p_payload_start_actual[1]==0 && p_payload_start_actual[2]==1)
        {
            // Search for start code??
```

TABLE A-continued

Recycled Buffer Processing Source Code Listing

```
                    if (p_payload_start_actual[3]==0 x b3)
                    {
                        // SYNC_index "set" must happen PRIOR to MakeAncillary call or
else the
                        // "find" will not get recorded if we are in bLookingForSync mode.
                        SYNC_index = index+PES_header_length;
                        MakeAncillary(aVidSEQ, index+PES_header_length, 0 x b3);
                    }
            }
            if (in_type==AudioTS)
            {
                    if (p_payload_start_actual[0]==0 x ff&&
(p_payload_start_actual[1]& 0 x f( ))==0 x f0)
                    {
                        // SYNC_index "set" must happen PRIOR to MakeAncillary call or
else the
                        // "find" will not get recorded if we are in bLookingForSync mode.
                        SYNC_index = index+PES_header_length;
                        MakeAncillary(aAudFrameStart, index+PES_header_length, 0 x fff);
                    }
            }
        }
        // Parse PTS and/or DTS.
        if (PTS_DTS_flags & 0 x 02)
        {
            // PTS only 0010 [32. .30] 1
            // PTS+DTS PTS portion 0011 [32. .30] 1
            if (PTS_DTS_flags==2) // PTS only.
                PTS = ParseTS_40(0 x 21);
            else
                PTS = ParseTS_40(0 x 31);
            if(!PTS)
            {
                // Could be BIG trouble. Marker bits were not set. Skip the rest of the header
                // assuming it to be bad.
                index = p_payload_start_actual-tp;
                return;
            }
            MakeAncillary(aPTS, index-5, PTS);
        }
        if (PTS_DTS_flags == 0 x 03)
        {
            // PTS+DTS DTS portion 0001 [32. .30] 1
            DTS = ParseTS_40(0 x 11);
            if(!DTS)
            {
                // Could be BIG trouble. Marker bits were not set. Skip the rest of the header
                // assuming it to be bad.
                index = p_payload_start_actual-tp;
                return;
            }
            MakeAncillary(aDTS, index-5, DTS);
        }
        // The order of "parsing" for the rest of the items is:
        // ESCR
        // ES_rate
        // DSM_trick_mode
        // additional_copy_info
        // PES_CRC
        // PES_extensions { a bunch inside here }
        // stuffing bytes
        // Since we dont care about any of these items, we'll just skip to the real payload at this point.
        index = p_payload_start_actual-tp;
        return;
}
DWORDLONG CDataBlock::ParseTS_40(unsigned char checkbits)
{
    DWORDLONG TS;
    TS = 0;
    // Check marker bits in first byte.
    // PTS only 0010 [32. .30] 1
    // PTS+DTS PTS portion 0011 [32. .30] 1
    // PTS+DTS DTS portion 0001 [32. .30] 1
    if( (tp[index] & 0 x f1) != checkbits) // xxxx [32. .30] x
    {
        assert(FALSE);
        return 0;
```

TABLE A-continued

Recycled Buffer Processing Source Code Listing

```
    }
        // Check other marker bits
    if( (tp[index+2] & 0 x 01) != 0 x 01 || (tp[index+4] & 0 x 01) != 0 x 01)
    {
        assert(FALSE);
        return 0;
    }
    TS (tp[index] & 0 x 08) >> 3;        // 33rd bit.
    TS = (TS << 1) | (tp[index++] & 0 x 06) >> 1;
    TS = (TS << 8) | tp[index++];
    TS = (TS << 7) | ((tp[index++] & 0 x fe) >> 1);
    TS = (TS << 8) | tp[index++];
    TS = (TS << 7) | ((tp[index++] & 0 x fe) >> 1);
    if (TS==0)           // In the zero case, we'll make it "1" instead. This solves the problem of
        TS = 1; // inserting a zero-pts value into the ring which is a "non-pts" in our book.
    return TS;
}
void CDataBlock::MakeAncillary(QI_AncillaryType atype, unsigned int at index, DWORDLONG
at_value)
{
    QI_ANCILLARY_DATA ad;
    ad.aType = atype;
    ad.aValue = at_value;
    SetErrBit(atype);
    // Now, index is tricky. The rules created for ancillary data dictate that the index
    // listed is "offset" or "modified" depending on the output type and the ancillary data type.
    // No ancillary data is written while scanning for synchronization points.
    if (bLookingForSync && SYNC_index==-1)
        return;
    switch(out_type)
    {
    case TS:
        ad.aIndex = (int)(p_curout-p_data_out) + at_index      // Calculate an index based on
beginning of data_out.
        break;
    case PES:
//      assert(FALSE);
        break;
    case LengthRichPES:
        assert(FALSE);
        break;
    case ES:
        switch (atype)
        {
//enum QI_AncillaryType {InvalidMinAT, aPTS, aDTS, aPCRb, aPCRx, aSCR,
//      aPESHeader, aVidSEQ, aAudFrameStart, aDiscontinuity, aScrambled,
//      aRepeatPacket, aStuffingPacket, aReservedField, aNoPayload, aBadSyncByte47,
        case aPTS:
        case aDTS:
        case aPCRb:
        case aPCRx:
        case aScrambled:
        case aDiscontinuity:
        case aVidSEQ:
        case aNoPayload:
        case aStuffingPacket:
        case aRepeatPacket:
        case &AudFrameStart:
        case aBadSyncByte47:
//      case aESCR:
//      case aPESHeader:
            // Essentially remove "index" since in all of these cases, index is an offset into
            // the transport header or PES header (which follows the transport header) and in
            // ES mode, both the PES header and transport header will be removed. So, the
            // final index should point to the place in the output stream where the next
            // valid ES payload will be laid down.
            ad.aIndex = (int)(p_curout-p_data_out);
            break;
        }
        break;
    default:
        assert(FALSE);
        break;
    }
    // Now comes the tricky part.
    // The idea is to figure out whether or not we have enough space at our "p_ancillary_cur" to
    // lay down one more ancillary data packet. If so, just do it.
```

TABLE A-continued

Recycled Buffer Processing Source Code Listing

```
    //
    // If not, then we have to move the "already done" portion of ancillary data to the BEGINNING
    // of the circular buffer and then readjust the pointers. At that point, we're ready to laydown
    // our ancillary data packet.
        if(p_ancillary_cur + sizeof(QI_ANCILLARY_DATA) >= p_circ_out->GetEndPtr( ))
        {
            memcpy(p_circ_out->GetStartPtr( ), p_ancillary_start, num_ancillary *
sizeof(QI_ANCILLARY_DATA));
            p_ancillary_start = p_circ_out->GetStartPtr( );
            p_ancillary_cur = p_ancillary_start + num_ancillary * sizeof(QI_ANCILLARY_DATA);
        }
        // Now we have room for one more record no matter what.
        memcpy(p_ancillary_cur, &ad, sizeof(QI_ANCILLARY_DATA));
        // Adjust for the new record.
        num_ancillary++;
        p_ancillary_cur += sizeof(QI_ANCILLARY_DATA);
}
void CDataBlock::GetBlockInfo(PQI_STREAMOUT p_str)
{
    p_str->pstream = p_data_out;
    p_str->stream_len len_data_out;
    p_str->num_ancillary_elements = num_ancillary;
    p_str->p_ancillary = (PQI_ANCILLARY_DATA)p_ancillary_start;
}
void CDataBlock::setSyncToFrame( )
{
    bLookingForSync = TRUE;
}
void CDataBlock::DeleteTempTrans( )
{
    if (p_copy_curtrans)
        delete [ ] p_copy_curtrans;
    if (p_copy_lasttrans)
        delete [ ] p_copy_lasttrans;
    if (p_copy_nexttrans)
        delete [ ] p_copy_nexttrans;
    p_copy_lasttrans = NULL;
    p_copy_curtrans = NULL;
    p_copy_nexttrans = NULL;
}
void CDataBlock::FormatTransPacket(unsigned char* tpak)
{
#ifdef _DEBUG
    assert(tpak);
    sprintf(TransOut, "Header: SB:%02x Bits:%01x PID:%04x Bits:%01x CC:%01x\n",
        tpak[0], (tpak[1]&0 x e0)>>5, ((tpak[1]&0 x 1f)<<8)|tpak[2],
        (tpak[3]&0 x f0)>>4, tpak[3]&0 x 0f);
    HexAsciiDump((char*)(TransOut+strlen(TransOut)), (char*)(tpak+4), TRANSPORT_SIZE-4);
#endif
}
void CDataBlock::DumpDataBlock(unsigned char * ptpaks, unsigned int index_interest unsigned int
num_packets, QI_AncillaryType anc)
{
#if 0
#ifdef _DEBUG
    int I;
    if(!fp_dump)
        fp_dump = fopen("DataBlockDump.txt", "a+");
    if (fp_dump)
    {
        fprintf(fp_dump, "\n******************** DUMP START
*****************************\n\n");
        fprintf(fp_dump, "DatablockDump: Num_Packets=%d, Packet of Interest=%d,
lastAncillary=%d\n\n", num_packets, index_interest, (int)anc);
        for (i=0;i<(int)num_packets;i++)
        {
            fprintf(fp_dump, "\nPACKET# %d\n", i);
            FormatTransPacket(ptpaks+(i*TRANSPORT_SIZE));
            fwrite(TransOut, sizeof(char), strlen(TransOut), fp_dump);
        }
        fprintf(fp_dump, "******************************DUMP COMPLETE
*****************************\n †n";
    }
endif
endif
}
void CDataBlock::setLastCC(unsigned char lcc)
```

TABLE A-continued

Recycled Buffer Processing Source Code Listing

```
{
    assert(lcc < 0 x 10);
    prev_cont = lcc;
}
//
// Debug function just for "pre-screening" a block of transport packets.
// This function *ONLY* checks for continuity.
//
void CDataBlock::PreCCCheck( )
{
#ifdef _DEBUG
    int I, num_packets;
    unsigned char* p_packet;
    unsigned char curCC;
    assert(FALSE); // Leave this when we DONT want the function to be used.
    p_packet = p_data_in;
    assert(len_data_in % TRANSPORT_SIZE ==0);
    num_packets = len_data_in / TRANSPORT_SIZE;
    for (i=0; I<num_packets; i++, p_packet += TRANSPORT_SIZE)
    {
        assert(*p_packet == 0 x 47);
        curCC = p_packet[3] & 0 x 0f;
        if(((prev_cont+1)%0 x 10) != curCC)
        {
            DumpDataBlock(p_data_in, I, num_packets, InvalidMinAT);
        }
    }
endif
}
BOOL CDataBlock::getNeedsReSync( )
{
    return bLookingForSync;
}
void CDataBlock::SetErrBit(QI_AncillaryType atype)
{
    assert((int)atype > InvalidMinAT && (int)atype <InvalidMaxAT);
    assert((int)atype < sizeof(ErrBits)*8-1);    // ErrBits is a 32Bit signed value. Cant set any more
bits than this.
    ErrBits |= 1<<(int)atype;
}
BOOL CDataBlock::IsErrBitSet(QI_AncillaryType atype)
{
    assert((int)atype > InvalidMinAT && (int)atype <InvalidMaxAT);
    assert((int)atype < sizeof(ErrBits)*8-1);    // ErrBits is a 32Bit signed value. Cant set any more
bits than this.
    return (BOOL)(ErrBits & 1<<(int)atype);
}
```

Table B below is a source code listing of a C++-specific class in Table A. implementation of a definition of recycled buffer processing

TABLE B

Definition of Recycled Buffer Processing Class, Source Code Listing

```
// DataBlock.h: interface for the CDatablockclass.
//
//////////////////////////////////////////////////////////////
#if !defined(AFX_datablock_H__D9F6D8E3_4D63_11D2_A583_00A0C98A283A__INCLUDED_)
#define AFX_datablock_H__D9F6D8E3_4D63_11D2_A583_00A0C98A283A__INCLUDED_
#if _MSC_VER >= 1000
#pragma once
#endif// _MSC_VER >= 1000
#include "QIMPEGTransport.h"
#include "CircularBuff.h"
class CDatablock
{
public:
    BOOL IsErrBitSet(QI_AncillaryType atype),
    int getDiscErrors( ) { return disc_errors; },
    BOOL getNeedsResync( );
    void PreCCCheck( );
```

TABLE B-continued

Definition of Recycled Buffer Processing Class,
Source Code Listing

```
    unsigned char getCC( ) { return prev_cont; };
    void setLastCC(unsigned char lcc);
    unsigned long getOutputLength( ) { return len_data_out; };
    unsigned long getInputLength( ) { return len_data_in; };
    unsigned long getNumAncillary( ) { return num_ancillary; };
    BOOL getLookingForSync( ) { return bLookingForSync; };
    void setSyncToFrame( );
    void GetBlockInfo(PQI_STREAMOUT p_str);
    void ParsePESHeader( );
    void ProcessBlock( );
    int InputCopy(char* p_in, unsigned long len);
    CDataBlock(CCircularBuff* p_bin, CCircularBuff* p_bout, QI_InputStreamType it,
QI_OutputStreamType ot);
    virtual ~CDataBlock( );
protected:
    void SetErrBit(QI_AncillaryType atype);
    int disc_errors;
    DWORD ErrBits;
    FILE* fp_dump;
    void DumpDataBlock(unsigned char* ptpaks, unsigned int index_interest, unsigned int
num_packets, QI_AncillaryType anc);
    char TransOut[1024];
    void FormatTransPacket(unsigned char* tpak);
    void DeleteTempTrans( );
    unsigned char* p_copy_nexttrans;
    unsigned char* p_copy_curtrans;
    unsigned char* p_copy_lasttrans;
    QI_AncillaryType lastAncillary;
    BOOL bLookingForSync;
    void MakeAncillary(QI_AncillaryType atype, unsigned int at_index DWORDLONG at_value);
    DWORDLONG ParseTS_40(unsigned char checkbits);
    void ParseAdaptationField( );
    unsigned char* ParseTransport(unsigned char* p_packet, unsigned int* p_payload_len);
    void FixupAncillaryPointers( );
    void SetupOutputBuffer( );
    CCircularBuff* p_circ_in;
    CCircularBuff* p_circ_out;
    unsigned char* p_data_in;
    unsigned long len_data_in;
    unsigned char* p_data_out;
    unsigned long len_data_out;
    unsigned char* p_curout;
    QI_InputStreamType in_type;
    QI_OutputStreamType out_type;
    unsigned char* p_ancillary_start;
    unsigned char* p_ancillary_cur;
    unsigned long num ancillary;
    QI_ANCILLARY_DATA ancillary_entry;
    unsigned int index;        // "global" Index into transport packet.
    unsigned char* tp;         // Transport packet being scanned.
    unsigned char prev_cont;
    // PES header entries
    unsigned int PES_length;
    unsigned char scrambling_control;
    unsigned char data_alignment_indicator;
    unsigned char PTS_DTS_flags;
    DWORDLONG PTS, DTS;
    int SYNC_index;
};
class CDataBlockList: public CPtrList
{
public:
    CDataBlock* Find(const char* pdata);
    CDataBlockList( );
    virtual ~CDataBlockList( );
    POSITION AddBlock(CDataBlock*pdb);
    int DeleteBlock(char* pdata);
    CDataBlock* RemoveHead( );
protected:
    POSITION FindPos(char* pdata);
};
#endif// !defined(AFX_datablock_H__D9F6D8E3_4D63_11D2_A583_00A0C98A283A__INCLUDED_)
```

Table C below is a source code listing of a C++-specific implementation of a definition of global objects used in the system disclosed herein.

TABLE C

Global Object Definition, Source Code Listing

```
#ifndef_H_TRANSPORTINTERFACE
#define_H_TRANSPORTINTERFACE
#include <afxwin.h>
#include <assert.h>
#define TRANSPORT_SIZE 188
#define QI_OK 0 // - - - Success.
#define QI_STREAM_UNREGISTERED 8 //- source/handle not found internally
#define QI_STREAM_ALREADY_REGISTERED 9 //-source/handle already in internal lists.
#define QI_INVALID_INTYPE 16        //-input type not supported.
#define QI_INVALID_OUTTYPE 17       //-output type not supported.
#define QI_NO_MEMORY 32             //-No memory for adding stream to internal
lists.
#define QI_NODATA_AVAILABLE 33          //-Currently there is no data blocks available on the
output.
#define QI_INPUTBUFFER_MOD188_ERROR 34    //-Input data buffers must be given in modulo-188
byte increments.
#define QI_NODECODER 128
#define QI_NOWINDOW 129
enum QI_InputStreamType {InvalidMinIT, VideoTS, AudioTS, InvalidMaxIT};
enum QI_OutputStreamType {InvalidMinOT, TS, PES, LengthRichPES, ES, InvalidMaxOT};
enum QI_AncillaryType {InvalidMinAT, aPTS, aDTS, aPCRb, aPCRx, aESCR,
        aPESHeader, aVidSEQ, aAudFrameStart, aDiscontinuity, aScrambled,
        aRepeatPacket, aStuffingPacket, aReservedField, aNoPayload, aBadSyncByte47,
        InvalidMaxAT};
// Discontinuity "type"
#define QI_DISC_CONTCOUNTER 0
#define QI_DISC_TRANSERROR 1
#define QI_DISC_ADAPT_FIELD 2
#define QI_DISC_BAD_SYNCBYTE 3
typedef struct QIAncillary {
    QI_AncillaryType aType;
    int aIndex;
    DWORDLONG aValue;
} QI_ANCILLARY_DATA, *PQI_ANCILLARY_DATA;
typedef struct QIStreamOut {
    unsigned char* pstream;
    int stream_len;
    int num_ancillary_elements;
    PQI_ANCILLARY_DATA p_ancillary;
} QI_STREAMOUT, *PQI_STREAMOUT;
typedef struct QITransStats {
    int num_in_blocks, num_out_blocks;
    int in_size, out_size;
    int in_bytes_allocated;
    // This is *NOT* the circular buffer output allocation value. It is ONLY the
    // number of bytes which are payload output. No ancillary data and *NO SLACK* bytes.
    int num_payload_outbytes;
    // int approx_out_bytes_allocated; // No support for this due to variable
    int disc_errors;
} QI_TRANS_STATS, *PQI_TRANS_STATS;
// stdcall ??
#define EXPORTAPI_declspec(dllexport)
#ifdef __cplusplus
extern "C"
{
#endif
/* API Definitions follow. */
EXPORTAPI int QI_DllEnabled(void);
//
// Input and config items
//
EXPORTAPI int QI_RegisterStream(int source, unsigned int handle, QI_InputStreamType in_type,
QI_OutputStreamType out_type);
EXPORTAPI int QI_UnRegisterStream(int source, unsigned int handle);
EXPORTAPI int QI_ReSync(int source, unsigned int handle);
EXPORTAPI int QI_FreeResourcesForStream(int source, unsigned int handle);
EXPORTAPI int QI_TransportInputCopy(int source, unsigned int handle, char* p_datain, unsigned long
len);
//EXPORTAPI int QI_TransportInputReference(int source, unsigned int stream_handle, const char*
p_datain, unsigned long len);
//
// Output interfaces
//
```

TABLE C-continued

Global Object Definition, Source Code Listing

EXPORTAPI int QI_GetOutputStream(int source, unsigned int handle, PQI_STREAMOUT p_streamout);
EXPORTAPI int QI_GetStats(int source, unsigned int handle, PQI_TRANS_STATS p_stats);
ifdef___cplusplus
}
endif
endif Table D below is a source code listing of a C++-specific implementation of a module that oversees data blocks and that keeps track of the data blocks.

TABLE D

Data Block Tracking, Source Code Listing

```
// Transport.cpp: implementation of the CTransport class.
//
//////////////////////////////////////////////////////////////
#include "Transport.h"
#ifdef _DEBUG
#undef THIS_FILE
static char THIS_FILE[ ]=__FILE__;
#define new DEBUG_NEW
#endif
#define MEGABYTh 1024*1024
#define KBYTE 1024
//#define DUMP_DATA
#define VIDEO_CIRCULAR_BUFF_SIZE 2 * MEGABYTE
#define AUDIO_CIRCULAR_BUFF_SIZE VIDEO_CIRCULAR_BUFF_SIZE/8
//////////////////////////////////////////////////////////////
// Construction/Destruction
//////////////////////////////////////////////////////////////
CTransport::CTransport(int src, unsigned int han, QI_IputStreamType in_type, QI_OutputStreamType
out)
{
    fp_dump = NULL;
    fp_dump_Getout = NULL;
    source = src;
    handle = han;
    stream_type = in_type;
    out_type = out;
    in_allocated = 0;
    num_payload_outbytes = 0;
    prev_lastCC = 0 x ff;
    disc_errors = 0;
    // Timer section
    bCopiedDataToOutList = FALSE;
    bWaitTimerPassed = FALSE;
    time_start = 0;
    // Assume we'll want to look for a sync initially. (at least in ES mode)
    if (out_type==ES || out_type==PES || out_type==LengthRichPES)
        setReSync( );
    assert(out_type==ES || out_type==PES);     // Only supporting elementary streams at this point.
    // Do *NOT* initialize the input buffer here. If REFERENCE copies on the input are
    // used, then there is no need to allocate an input circular buffer.
    // Also, do not initialize the output buffer here since we can't report the
    // "out of memory" condition to the caller from a constructor.
}
CTransport::~CTransport( )
{
    if (fp_dump)
        fclose(fp_dump);
}
void CTransport::FreeResources( )
{
}
int CTransport::InputCopy(char * p_in, unsigned long len)
{
    CDatablock*pdb;
    unsigned long buflen;
    if(len % 188 != 0)
    {
//      assert(FALSE);
        return QI_INPUTBUFFER_MOD188_ERROR;
```

TABLE D-continued

Data Block Tracking, Source Code Listing

```
        }
    //
    // Uninitialized circular buffers?
    //
    if (!in_buff.GetStartPtr( ))
    {
        switch(stream_type)
        {
        case VideoTS:
            buflen = VIDEO_CIRCULAR_BUFF_SIZE;
            break;
        case AudioTS:
            buflen = AUDIO_CIRCULAR_BUFF_SIZE;
            break;
        default:
            assert(FALSE);
            buflen = 0;
            break;
        }
        if(!in_buff_SetBufferSize(buflen))
            return QI_NO_MEMORY;
        if (!out_buff.SetBufferSize(buflen))
            return QI_NO_MEMORY;
    }
    // Make a new datablockfor the incoming data.
    pdb = new CDataBlock(&in_buff &out_buff stream_type, out_type);
    if(!pdb)
        return QI_NO_MEMORY;
    in_allocated += len;
    pdb->InputCopy(p_in, len);
    dl.Lock( );
    data_list_in.AddBlock(pdb);
    dl.Unlock( );
    return QI_OK;
}
CTransportList::CTransportList( )
{
}
CTransportList::~CTransportList( )
    while(!IsEmpty( ))
        delete RemoveHead( );
}
POSITION CTransportList::AddStream(CTransport* ptr)
{
    return AddTail(ptr);
}
CTransport* CTransportList::RemoveHead( )
{
    assert(!IsEmpty( ));
    if(IsEmpty( ))
        return NULL;
    else
        return (CTransport*)CPtrList::RemoveHead( );
}
CTransportList::DeleteStream(int source, unsigned int handle)
{
CTransport* pt;
POSITION pos;
    pos = FindPos(source, handle);
    if(!pos)
        return QI_STREAM_UNREGISTERED;
    else
    {
        pt = (CTransport*)GetAt(pos);
        RemoveAt(pos);
        delete pt;
        return QI_OK;
    }
}
CTransport* CTransportList::Find(int source, unsigned int handle)
{
CTransport* pt;
POSITION pos;
    pos = FindPos(source, handle);
    if(!pos)
        return NULL;
    else
```

TABLE D-continued

Data Block Tracking, Source Code Listing

```
        {
            pt = (CTransport*)GetAt(pos);
            assert(pt);
            return pt;
        }
    }
}
POSITION CTransportList::FindPos(int source, unsigned int handle)
{
CTransport* pt;
POSITION pos, prevpos;
        pt = NULL;
        pos = GetHeadPosition( );
        while(pos)
        {
            prevpos = pos;
            // Get entry pointer and advance pos to next entry.
            pt = (CTransport*)GetNext(pos);
            assert(pt);
            if (pt->getSource( )==source && pt->getHandle( )==handle)
                return prevpos;
        }
        return NULL;
}
void CTransport::ProcessInputBlock( )
{
    CDataBlock* pdb;
    dl.Lock( );
    if(!data_list_in.IsEmpty( ))
    {
        pdb = data_list_in.RemoveHead( );
        dl.Unlock( );
        assert(pdb);
        if(bLookingForSync)
            pdb->setSyncToFrame( );
        // continue CC checking from previous blocks.
        if(prev_lastCC != 0 x ff)
            pdb->setLastCC(prev_lastCC);
//      pdb->PreCCCheck( );
        // Translate the input stream into the output "type" desired with ancillary data too.
        pdb->ProcessBlock( );
        disc_errors += pd->getDiscErrors( );
        // If we process the block and there are errors, we can "reset" the resync need at this
        // level for the next block.
        if (pdb->getNeedsResync( ))
            setReSync( );
        // Prep for next block continuation.
        prev_lastCC = pdb->getCC( );
        if(bLookingForSync && !pdb->getLookingForSync( ))       // STILL looking for sync?
            bLookingForSync = FALSE;
        in_allocated -= pdb->getInputLength( );
        assert(in_allocated >= 0);
        if (pdb->getOutputLength( ))
        {
            // Add the
            approx_out_allocated += pdb->getNumAncillary( )*
//  sizeof(QI_ANCILLARY_DATA);
//          approx_out_allocated += pdb->getOutputLength( );
            num_payload_outbytes += pdb->getOutputLength( );
            // After processing, the block is moved from "limbo" to the output list.
            // At this point, the consumer will see that there is newly processed data to grab.
            dl.Lock( );
            data_list_out.AddBlock(pdb);
            dl.Unlock( );
            if (!bCopiedDataToOutList)
            {
                bCopiedDataToOutList = TRUE;
                time_start = GetTickCount( );
            }
        }
        else
        {
            // We must have been searching for sync and so we may as well delete it now
            // rather than putting it in the output queue (empty).
            delete pdb;
        }
    }
```

TABLE D-continued

Data Block Tracking, Source Code Listing

```
        else
            dl.Unlock( );
}
int CTransport::GetOutputBlock(PQI_STREAMOUT p_str)
{
    CDataBlock* pdb;
    assert(p_str);
    dl.Lock( );
    if(data_list_out.IsEmpty( ))
    {
        dl.Unlock( );
        return QI_NODATA_AVAILABLE;
    }
#ifdef TIMER_ENABLED
    // Check for 'timer' fill.
    if(!bWaitTimerPassed)
    {
        if(!bCopiedDataToOutList || GetTickCount( )-time_start<TIMER_WAIT)
        {
            dl.Unlock( );
            return QI_NODATA_AVAILABLE;
        }
        else
        {
            // Data has been copied to the output list and timer has passed.
            // Go ahead and let the output data flow.
            bWaitTimerPassed=TRUE;
        }
    }
endif
    pdb = data_list_out.RemoveHead( );
    assert(pdb);
    dl.Unlock( );
    num_payload_outbytes -= pdb->getOutputLength( );
    pdb->GetBlockInfo(p_str);
#ifdef DUMP_DATA
    if (!fp_dump_Getout)
    {
        if (stream_type==VideoTS)
            fp_dump_Getout = fopen("TH_Video_Getout.mpg", "wb");
        else
            fp_dump_Getout = fopen("TH_Audio_Getout.mpg", "wb");
        assert(fp_dump_Getout);
    }
    if(fp_dump_Getout)
    {
        assert(p_str->stream_len);
        assert(p_str->pstream);
        fwrite(p_str->pstream, sizeof(char), p_str->stream_len, fp_dump_Getout);
        fflush(fp_dump_Getout);
    }
endif
    // It is now out of the output queue and can be deleted. The memory pointers are still
    // valid until the circular queue gets nuked on wraparound.
    delete pdb;
    return QI_OK;
}
int CTransport::GetNumOutputBlocks( )
{
    int nb;
    dl.Lock( );
    nb = data_list_out.GetCount( );
    dl.Unlock( );
    return nb;
}
int CTransport::GetNumInputBlocks( )
{
    int nb;
    dl.Lock( );
    nb = data_list_in.GetCount( );
    dl.Unlock( );
    return nb;
}
int CTransport::GetStats(PQI_TRANS_STATS p_stats)
{
    p_stats->num_in_blocks = GetNumInputBlocks( );
    p_stats->num_out_blocks = GetNumOutputBlocks( );
```

TABLE D-continued

Data Block Tracking, Source Code Listing

```
    p_stats->in_size = in_buff.GetBufferSize( );
    p_stats->out_size = out_buff.GetBufferSize( );
    p_stats->in_bytes_allocated = in_allocated;
    p_stats->num_payload_outbytes = num_payload_outbytes;
    p_stats->approx_out_bytes_allocated = approx_out_allocated;
    p_stats->disc_errors = disc_errors;
    return QI_OK;
}
```

Table E below is a source code listing of a C++-specific implementation of a definition for a Data block tracking.

TABLE E

Definition of Datablock Tracking, Source Code Listing

```
// Transport.h: interface for the CTransport class.
//
//////////////////////////////////////////////////////////////////////
#if !defined(AFX_TRANSPORT_H__F9F29140_427B_11D2_A583_00A0C98A283A__INCLUDED_)
#define AFX_TRANSPORT_H__F9F29140_427B_11D2_A583_00A0C98A283A__INCLUDED_
#if _MSC_VER >= 1000
#pragma once
#endif// _MSC_VER >= 1000
#include <afxmt.h>
#include "QIMPEGTransport.h"
#include "CircularBuff.h"
#include "DataBlock.h"
#define TIMER_WAIT    2000      // Wait 2000 ms before allowing data to go "out"
class CTransport
{
public:
    int getDiscErrors( ) { return disc_errors; };
    void setReSync( ) { bLookingForSync=TRUE; };
    int GetStats(PQI_TRANS_STATS p_stats);
    int GetNumInputBlocks( );
    int GetNumOutputBlocks( );
    int GetOutputBlock(PQI_STREAMOUT p_str);
    void ProcessInputBlock( );
    int InputCopy(char* p_in, unsigned long len);
    void FreeResources( );
    CTransport(int src, unsigned int han, QI_InputStreamType in_type, QI_OutputStreamType out);
    virtual ~CTransport( );
    int getSource( ) { return source; };
    unsigned int getHandle( ) { return handle; };
protected:
    FILE* fp_dump;
    FILE* fp_dump_Getout;
    int disc_errors;
    unsigned char prev_lastCC;
    CCriticalSection dl;
    int in_allocated;
    BOOL bLookingForSync;
    int source;
    unsigned int handle;
    QI_InputStreamType stream_type;
    QI_OutputStreamType out_type;
    CCircularBuff in_buff, out_buff;
    CDataBlockList data_list_in, data_list_out;
    // Timer variables
    BOOL bCopiedDataToOutList, bWaitTimerPassed;
    DWORD time_start;
    unsigned long num_payload_outbytes;
};
class CTransportList: public CPtrList
{
public:
    CTransport* Find(int source, unsigned int handle);
    CTransportList( );
    virtual ~CTransportList( );
    POSITION AddStream(CTransport*pt);
    int DeleteStream(int source, unsigned int handle);
    CTransport* CTransportList::RemoveHead( );
```

TABLE E-continued

Definition of Datablock Tracking, Source Code Listing

```
protected:
    POSITION Findpos(int source, unsigned int handle);
#endif//
!defined(AFX_TRANSPORT_H__F9F29140_427B_11D2_A583_00A00C98A283A__INCLUDED_)
```

Table F below is a source code listing of a C++-specific implementation of a definition of recycled buffer processing.

TABLE F

Definition of Recycled Buffer Processing, Source Code Listing

```
// DataBlock.h: interface for the CDatablockclass.
//
//////////////////////////////////////////////////////
#if !defined(AFX_datablock_H__D9F6D8E3_4D63_11D2_A583_00A0C98A283A__INCLUDED_)
#define AFX_datablock_H__D9F6D8E3_4D63_11D2_A583_00A0C98A283A__INCLUDED_
#if _MSC_VER >= 1000
#pragma once
#endif// _MSC_VER >= 1000
#include "QIMPEGTransport.h"
#include "CircularBuff.h"
class CDatablock
{
public:
    BOOL IsErrBitSet(QI_AncillaryType atype);
    int getDiscErrors( ) { return disc_errors; };
    BOOL getNeedsResync( );
    void PreCCCheck( );
    unsigned char getCC( ) { return prev_cont; };
    void setLastCC(unsigned char lcc);
    unsigned long getOutputLength( ) { return len_data_out; };
    unsigned long getInputLength( ) { return len_data_in; };
    unsigned long getNumAncillary( ) { return num_ancillary; };
    BOOL getLookingForSync( ) { return bLookingForSync; };
    void setSyncToFrame( );
    void GetBlockInfo(PQI_STREAMOUT p_str);
    void ParsePESHeader( );
    void ProcessBlock( );
    int InputCopy(char* p_in, unsigned long len);
    CDataBlock(CCircularBuff* p_bin, CCircularBuff* p_bout, QI_InputStreamType it,
QI_OutputStreamType ot);
    virtual ~CDataBlock( );
protected:
    void SetErrBit(QI_AncillaryType atype);
    int disc_errors;
    DWORD ErrBits;
    FILE* fp_dump;
    void DumpDataBlock(unsigned char* ptpaks, unsigned int index_interest, unsigned int
num_packets, QI_AncillaryType anc);
    char TransOut[1024];
    voidFormatTransPacket(unsigned char* tpak);
    void DeleteTempTrans( );
    unsigned char* p_copy_nexttrans;
    unsigned char* p_copy_curtrans;
    unsigned char* p_copy_lasttrans;
    QI_AncillaryType lastAncillary;
    BOOL bLookingForSync;
    void MakeAncillary(QI_AncillaryType atype, unsigned int at_index DWORDLONG at_value);
    DWORDLONG ParseTS_40(unsigned char checkbits);
    void ParseAdaptationField( );
    unsigned char* ParseTransport(unsigned char* p_packet, unsigned int* p_payload_len);
    void FixupAncillaryPointers( );
    void SetupOutputBuffer( );
    CCircularBuff* p_circ_in;
    CCircularBuff* p_circ_out;
    unsigned char* p_data_in;
    unsigned long len_data_in;
    unsigned char* p_data_out;
    unsigned long len_data_out;
    unsigned char* p_curout;
    QI_InputStreamType in_type;
    QI_OutputStreamType out_type;
```

TABLE F-continued

Definition of Recycled Buffer Processing, Source Code Listing

```
    unsigned char* p_ancillary_start;
    unsigned char* p_ancillary_cur;
    unsigned long num_ancillary;
    QI_ANCILLARY_DATA ancillary_entry;
    unsigned int index;          // "global" Index into transport packet.
    unsigned char* tp;           // Transport packet being scanned.
    unsigned char prev_cont;
    // PES header entries
    unsigned int PES_length;
    unsigned char scrambling_control;
    unsigned char data_alignment_indicator;
    unsigned char PTS_DTS_flags;
    DWORDLONG PTS, DTS;
    int SYNC_index;
};
class CDataBlockList: public CPtrList
{
public:
    CDataBlock* Find(const char* pdata);
    CDataBlockList( );
    virtual ~CDataBlockList( );
    POSITION AddBlock(CDataBlock*pdb);
    int DeleteBlock(char* pdata);
    CDataBlock* RemoveHead( );
protected:
    POSITION FindPos(char* pdata);
};
#endif// !defined(AFX_datablock_H_D9F6D8E3_4D63_11D2_A583_00A0C98A283A__INCLUDED_)
```

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for processing streaming data in a computer system, comprising the steps of:
   minimizing memory copying;
   minimizing allocations and deallocations of objects; and
   using a plurality of separate queues which contain lists of references to data blocks;
   said queues comprising any of:
   an idle queue for keeping a cache of currently unused data block objects to facilitate recycling objects and minimize allocation and deallocation of said data block objects;
   an input queue for use as a holding area for incoming data blocks until each block can be processed;
   a limbo queue used for localized streams which are larger than a single data block that needs to be held for further global processing; and
   an output queue for holding resultant data blocks after they are processed from said input queue to said limbo queue and finally placed into said output queue.

2. A method for processing streaming data in a computer system, comprising the steps of:
   minimizing memory copying;
   minimizing allocations and deallocations of objects;
   using a plurality of separate queues which contain lists of references to data blocks;
   said queues comprising any of:
   an idle queue for keeping a cache of currently unused data block objects to facilitate recycling objects and minimize allocation and deallocation of said data block objects;
   an input queue for use as a holding area for incoming data blocks until each block can be processed;
   a limbo queue used for localized streams which are larger than a single data block that needs to be held for further global processing; and
   an output queue for holding resultant data blocks after they are processed from said input queue to said limbo queue and finally placed into said output queue; and
   placing a data block back onto said idle queue for reuse when said data block is taken from said output queue and its resultant data are sent to a decoder or post processing unit.

3. A method for processing streaming data in a computer system, comprising the steps of:
   minimizing memory copying;
   minimizing allocations and deallocations of objects;
   segmenting processing duties via multithreading; and
   providing any of the following separate processing threads to facilitate separation of duties:
   an input thread for taking incoming memory from a streaming media source and making a data block by pulling a data block from an idle queue, assigning referenced memory pointers to incoming memory, and placing a new data block onto an input queue;
   a processing thread for taking data blocks from an input queue and processing said data blocks by parsing or modifying the data as necessary to prepare said data block for output, wherein if it is determined that all required information for a localized stream of data is not fully contained in a single data block, then said data block is placed in a limbo queue until said localized stream is complete; and wherein said data blocks which makeup said localized fully processed stream are moved to an output queue when said localized stream is completely processed; and
   an output thread for taking data blocks from said output queue and for handling resultant to a downstream processing unit; wherein these corresponding data blocks are then placed back on said idle queue for use again by an incoming data stream.

4. A method for processing streaming data in a computer system, comprising the steps of:

minimizing memory copying;

minimizing allocations and deallocations of objects; and providing a data block object which references where input data are found, where output data are post-processed, and the status of each of said input and output memory references.

5. An apparatus for processing streaming data in a computer system, comprising the steps of:

means for minimizing memory copying;

means for minimizing allocations and deallocations of objects; and a plurality of separate queues which contain lists of references to data blocks;

said queues comprising any of:

an idle queue for keeping a cache of currently unused data block objects to facilitate recycling objects and minimize allocation and deallocation of said data block objects;

an input queue for use as a holding area for incoming data blocks until each block can be processed;

a limbo queue used for localized streams which are larger than a single data block that needs to be held for further global processing; and an output queue for holding resultant data blocks after they are processed from said input queue to said limbo queue and finally placed into said output queue.

6. An apparatus for processing streaming data in a computer system, comprising the steps of:

means for minimizing memory copying;

means for minimizing allocations and deallocations of objects; and a plurality of separate queues which contain lists of references to data blocks;

said queues comprising any of:

an idle queue for keeping a cache of currently unused data block objects to facilitate recycling objects and minimize allocation and deallocation of said data block objects;

an input queue for use as a holding area for incoming data blocks until each block can be processed;

a limbo queue used for localized streams which are larger than a single data block that needs to be held for further global processing; and an output queue for holding resultant data blocks after they are processed from said input queue to said limbo queue and finally placed into said output queue; and means for placing a data block back onto said idle queue for reuse when said data block is taken from said output queue and its resultant data are sent to a decoder or post processing unit.

7. An apparatus for processing streaming data in a computer system, wherein processing duties are segmented via multithreading, comprising the steps of:

means for minimizing memory copying;

means for minimizing allocations and deallocations of objects; and any of the following separate processing threads to facilitate separation of duties:

an input thread for taking incoming memory from a streaming media source and making a data block by pulling a data block from an idle queue, assigning referenced memory pointers to incoming memory, and placing a new data block onto an input queue;

a processing thread for taking data blocks from an input queue and processing said data blocks by parsing or modifying the data as necessary to prepare said data block for output, wherein if it is determined that all required information for a localized stream of data is not fully contained in a single data block, then said data block is placed in a limbo queue until said localized stream is complete; and wherein said data blocks which makeup said localized fully processed stream are moved to an output queue when said localized stream is completely processed; and an output thread for taking data blocks from said output queue and for handling resultant to a downstream processing unit; wherein these corresponding data blocks are then placed back on said idle queue for use again by an incoming data stream.

8. An apparatus for processing streaming data in a computer system, comprising the steps of:

means for minimizing memory copying;

means for minimizing allocations and deallocations of objects; and a data block object which references where input data are found, where output data are post-processed, and the status of each of said input and output memory references.

* * * * *